(No Model.)

W. E. CONNER.
Churning Cream.

No. 242,275. Patented May 31, 1881.

WITNESSES
J. J. Lehman
John Crowell Jr.

INVENTOR
Wilson Eli Conner,
By Leggett & Leggett
ATTORNEYS

UNITED STATES PATENT OFFICE.

WILSON E. CONNER, OF REEDSVILLE, OHIO.

CHURNING CREAM.

SPECIFICATION forming part of Letters Patent No. 242,275, dated May 31, 1881.

Application filed March 15, 1881. (No model.)

*To all whom it may concern:*

Be it known that I, WILSON ELI CONNER, of Reedsville, in the county of Meigs and State of Ohio, have invented certain new and useful Improvements in Churn-Motors; and I do hereby declare the following to be a full, clear, and exact description of the invention, such as will enable others skilled in the art to which it pertains to make and use it, reference being had to the accompanying drawings, which form part of this specification.

My invention relates to an improvement in churn-motors; and the invention consists in certain features of construction and arrangement of parts, as will hereinafter be described, and pointed out in the claim.

Figure 1:
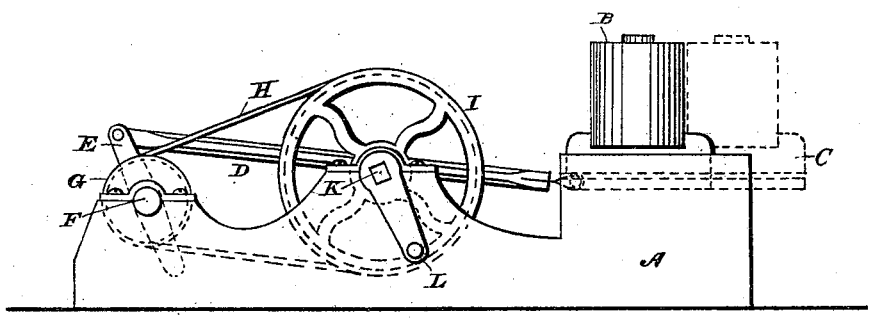
Figure 2:
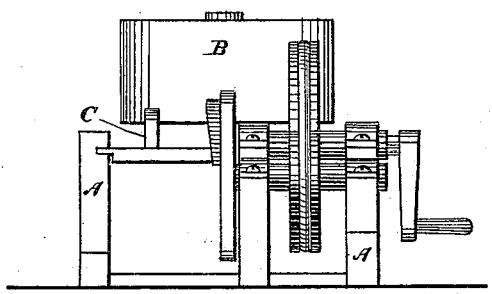

In the drawings, Figure 1 is a view in side elevation of a churn constructed according to my invention. Fig. 2 is a view in front elevation of the same.

In the said drawings, A represents a frame adapted to support the operative parts of my device.

B represents the container, in which the cream or milk to be churned is placed. This container rests upon a suitable platform, C, and is removably attached thereto. This may be accomplished in any suitable manner. To this platform is attached a pitman, D, which is connected at its other end with a crank, E. This crank E is permanently attached to a shaft, F, which carries the pulley G. This pulley is connected, by a suitable belt, H, with the drive-wheel I. This drive-wheel is secured to the shaft K. To this shaft K is attached the crank L.

I have discovered that butter made by this process is secured much quicker and easier than that obtained by any other process with which I am acquainted. The container is easier cleaned, as there are no dashers necessary. The parts of my device may be made of any suitable material and of any size.

If desired, the crank L may be removed and suitable gearing attached to the shaft K, by means of which it may be revolved by any power, as horse or steam power.

The operation of my device is as follows: The cream is placed in the container B and the container closed tightly. It is then placed upon the platform C, which is adapted to slide within the frame A, as indicated in the drawings. Power is applied to the shaft K, which, by means of the belt H, is communicated to the pulley G, and from thence, through the shaft F, to the crank E, which gives the pitman D, and with it the platform C and container B, a reciprocating motion.

What I claim is—

The combination, with the reciprocating table C, of the driving-wheel I, crank L, belt H, pulley G, crank E, and pitman D, substantially as set forth.

In testimony whereof I have signed my name to this specification in the presence of two subscribing witnesses.

WILSON ELI CONNER.

Witnesses:
JOHN BESON,
WILLIAM BAY.